United States Patent
Okita et al.

(10) Patent No.: US 11,787,283 B2
(45) Date of Patent: Oct. 17, 2023

(54) VEHICLE DRIVE APPARATUS AND VEHICLE DRIVE APPARATUS MANUFACTURING METHOD

(71) Applicants: AISIN CORPORATION, Aichi (JP); TOYOTA JIDOSHA KABUSHIKI KAISHA, Toyota (JP)

(72) Inventors: Sou Okita, Kariya (JP); Yosuke Suzuki, Hadano (JP)

(73) Assignees: AISIN CORPORATION, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/908,433

(22) PCT Filed: Mar. 31, 2021

(86) PCT No.: PCT/JP2021/014005
§ 371 (c)(1),
(2) Date: Aug. 31, 2022

(87) PCT Pub. No.: WO2021/201160
PCT Pub. Date: Oct. 7, 2021

(65) Prior Publication Data
US 2023/0088004 A1    Mar. 23, 2023

(30) Foreign Application Priority Data
Mar. 31, 2020   (JP) ................. 2020-065220

(51) Int. Cl.
*B60K 6/547* (2007.10)
*F16H 3/72* (2006.01)
(Continued)

(52) U.S. Cl.
CPC .............. *B60K 6/547* (2013.01); *F16H 3/72* (2013.01); *F16H 57/023* (2013.01);
(Continued)

(58) Field of Classification Search
CPC ............ B60K 6/547; B60K 2006/4816; B60K 2006/4825; F16H 3/72; F16H 57/023; F16H 57/037
(Continued)

(56) References Cited

U.S. PATENT DOCUMENTS

2008/0207372 A1* 8/2008 Holmes ................. F16H 3/728
  475/5
2009/0115350 A1* 5/2009 Heap ..................... B60W 10/02
  318/8

(Continued)

FOREIGN PATENT DOCUMENTS

JP    2013-023036 A    2/2013
JP    2019-119405 A    7/2019

*Primary Examiner* — Colby M Hansen
(74) *Attorney, Agent, or Firm* — Oliff PLC (57) ABSTRACT

A first rotation shaft (which is provided with a first gear) is assembled to a first case member so as to provide a first assembly. A second rotation shaft (which is provided with a second gear) and a third rotation shaft (which is provided with a third gear) are assembled to a support member so as to provide a second assembly. When the second assembly is assembled to the first assembly, the second assembly is rotatable around a third axis from a first position where the first gear and the second gear are located away from each other to a second position where the first gear and the second gear are in mesh with each other, and is positioned at the second position by using a positioning member.

9 Claims, 8 Drawing Sheets (51) Int. Cl.
*F16H 57/023* (2012.01)
*F16H 57/037* (2012.01)
*B60K 6/48* (2007.10)

(52) U.S. Cl.
CPC .... *F16H 57/037* (2013.01); *B60K 2006/4816* (2013.01); *B60K 2006/4825* (2013.01)

(58) Field of Classification Search
USPC .......................................................... 475/5
See application file for complete search history.

(56) References Cited

U.S. PATENT DOCUMENTS

2009/0131215 A1* 5/2009 Shamoto ................ B60K 6/445
 477/3
2013/0184111 A1 7/2013 Tsuchida et al.

* cited by examiner

VEHICLE DRIVE APPARATUS AND VEHICLE DRIVE APPARATUS MANUFACTURING METHOD

TECHNICAL FIELD

The present disclosure relates to vehicle drive apparatuses each including first to third gears that are herringbone gears respectively secured to first to third rotation shafts, and methods for manufacturing the vehicle drive apparatuses.

BACKGROUND ART

Patent Document 1, for example, discloses a hybrid drive apparatus (10), which is a vehicle drive apparatus to be installed on a vehicle, such as an FF (front-engine front-drive) type vehicle including an engine whose output shaft extends laterally with respect to the direction of travel of the vehicle. The hybrid drive apparatus (10) is a four-axis structure hybrid drive apparatus in which a first electric motor (MG1) and a motive power distribution mechanism (28) are disposed on a first axis coaxial with the output shaft of the engine, a counter shaft (18) is disposed on a second axis, a second electric motor (MG2) is disposed on a third axis, and a differential gear (24) is disposed on a fourth axis.

The hybrid drive apparatus (10) disclosed in Patent Document 1 provides a "split type" hybrid system that distributes motive power through the motive power distribution mechanism (28) such that a driving force from the engine is distributed to the first electric motor (MG1) and the counter shaft (18), allows a driving force from the second electric motor (MG2) to be input to the counter shaft (18), and outputs the driving force from the counter shaft (18) to the differential gear (224).

Manufacture of the hybrid drive apparatus (10) disclosed in Patent Document 1 involves: assembling, from a first side in an axial direction, the first electric motor (MG1) and the second electric motor (MG2) to a case (12b) including a partition wall provided substantially centrally in the axial direction, and covering the assembled components with a cover (12c); and assembling, from a second side in the axial direction, the motive power distribution mechanism (28), a composite gear shaft (40), the counter shaft (18), a motive power transmission shaft (20), and the differential gear (24) to the case (12b), and covering the assembled components with a housing.

RELATED ART DOCUMENTS

Patent Documents

Patent Document 1: Japanese Unexamined Patent Application Publication No. 2013-23036 (JP 2013-23036 A)

SUMMARY OF THE DISCLOSURE

Problem to be Solved by the Disclosure

Helical gears are usually used as gears of a hybrid drive apparatus. Helical gears, however, produce thrust force in an axial direction during driving force transmission. The thrust force is thus unfortunately applied to bearings, resulting in a driving force loss and/or generation of noise. A conceivable solution to this problem is, for example, to use herringbone gears, each including a pair of helical gears having opposite tooth traces, as gears of a hybrid drive apparatus. Such a solution enables, for example, a reduction in loss and/or noise reduction.

However, using herringbone gears as gears of a hybrid drive apparatus, for example, makes it impossible to cause the gears to mesh with each other in the axial direction because the gears each include a pair of tooth surfaces with opposite tooth traces and thus involves causing the gears to mesh with each other in a radial direction during assembly. Accordingly, using herringbone gears as the gears of the hybrid drive apparatus disclosed in Patent Document 1, for example, involves causing at least the composite gear shaft (40), the counter shaft (18), and the motive power transmission shaft (20) to be in mesh with each other at a different location and then assembling these components to the case (12b). The assembly of these three components is difficult to perform manually and requires a large jig and/or a dedicated facility, leading to an increase in cost.

Accordingly, an object of the present disclosure is to provide a vehicle drive apparatus that would be able to facilitate operations during assembly without an increase in cost if gears include meshing portions unable to mesh with each other in an axial direction, and a method for manufacturing the vehicle drive apparatus.

Means for Solving the Problem

The present disclosure provides a vehicle drive apparatus including:
a case including a first case member and a second case member;
a first rotation shaft disposed on a first axis;
a first gear secured to the first rotation shaft, the first gear being a herringbone gear;
a second rotation shaft disposed on a second axis different from the first axis;
a second gear secured to the second rotation shaft and in mesh with the first gear, the second gear being a herringbone gear;
a third rotation shaft disposed on a third axis different from the first axis and the second axis;
a third gear secured to the third rotation shaft and in mesh with the second gear, the third gear being a herringbone gear;
a support member including a plate portion having a plate shape, a first support portion supporting the second rotation shaft such that the second rotation shaft is rotatable relative to the plate portion, and a second support portion supporting the third rotation shaft such that the third rotation shaft is rotatable relative to the plate portion; and
a positioning member for positioning of the support member with respect to the case, in which
assembling the first rotation shaft to the first case member provides a first assembly,
assembling the second rotation shaft and the third rotation shaft to the support member provides a second assembly, and
with the first assembly and the second assembly assembled to each other, the first case member and the second case member are secured to each other.

The present disclosure provides a method for manufacturing a vehicle drive apparatus including:
a case including a first case member and a second case member;
a first rotation shaft disposed on a first axis;
a first gear secured to the first rotation shaft, the first gear being a herringbone gear;

a second rotation shaft disposed on a second axis different from the first axis;

a second gear secured to the second rotation shaft and in mesh with the first gear, the second gear being a herringbone gear;

a third rotation shaft disposed on a third axis different from the first axis and the second axis;

a third gear secured to the third rotation shaft and in mesh with the second gear, the third gear being a herringbone gear;

a support member including a plate portion having a plate shape, a first support portion supporting the second rotation shaft such that the second rotation shaft is rotatable relative to the plate portion, and a second support portion supporting the third rotation shaft such that the third rotation shaft is rotatable relative to the plate portion; and a positioning member for positioning of the support member with respect to the case, in which the method includes:

a first step involving assembling the first rotation shaft to the first case member so as to provide a first assembly;

a second step involving assembling the second rotation shaft and the third rotation shaft to the support member so as to provide a second assembly;

a third step involving disposing the plate portion of the support member such that the plate portion is located at an axial assembling position with respect to the first assembly, rotating the second assembly around the third axis from a first position where the first gear and the second gear are located away from each other to a second position where the first gear and the second gear are in mesh with each other, and subsequently performing positioning of the second assembly at the second position by using the positioning member, thus assembling the second assembly to the first assembly; and a fourth step involving securing the first case member and the second case member to each other, with the first assembly and the second assembly assembled to each other.

Accordingly, the vehicle drive apparatus and the vehicle drive apparatus manufacturing method are able to facilitate operations during assembly while eliminating the need for a large jig or a dedicated facility.

MODES FOR CARRYING OUT THE DISCLOSURE

First Embodiment

A first embodiment will be described below with reference to FIGS. 1 to 5.

Structure of Hybrid Drive Apparatus

Figure 1:
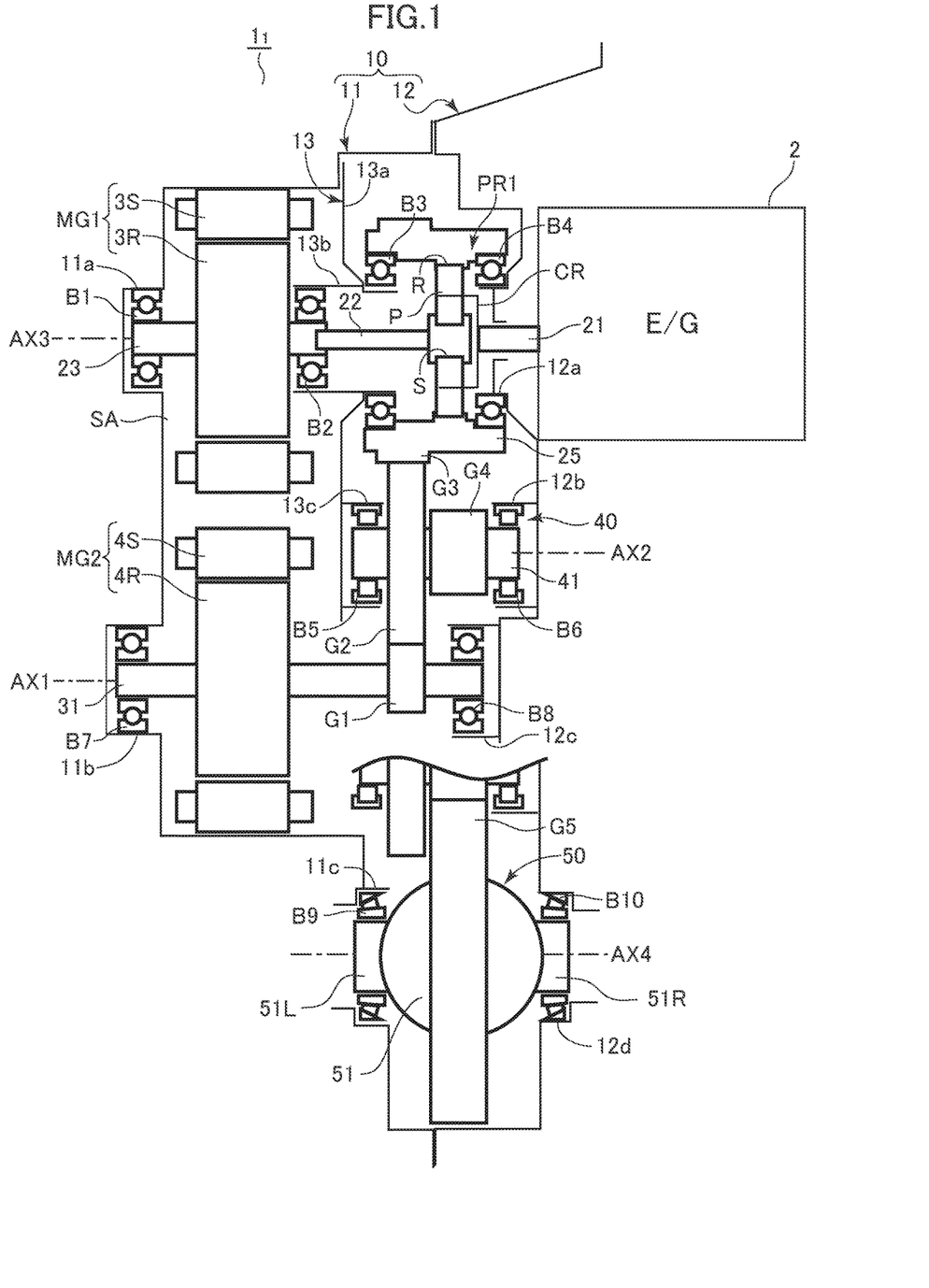
FIG. 1 is a schematic cross-sectional view illustrating a hybrid drive apparatus according to a first embodiment.

First, a structure of a hybrid drive apparatus $1_1$ according to the first embodiment will be described with reference to FIG. 1. The hybrid drive apparatus $1_1$, which is a vehicle drive apparatus, is suitable for use in a vehicle, such as an FF (front-engine front-drive) type vehicle including an engine 2 whose output shaft extends laterally with respect to the direction of travel, and is intended for use in a "split type" hybrid vehicle.

Specifically, the hybrid drive apparatus $1_1$ includes a case 10 including: a main case 11 serving as a first case member; and a housing case 12 serving as a second case member. In an internal space SA of the case 10, components are disposed on the following four axes: a first axis AX1; a second axis AX2 different from and parallel to the first axis AX1; a third axis AX3 different from and parallel to the first axis AX1 and the second axis AX2; and a fourth axis AX4 different from and parallel to the first to third axes AX1 to AX3. A center support 13 serving as a support member including a plate portion 13a having a plate shape is secured to and supported by the main case 11 included in the case 10.

Disposed on the third axis AX3 are: an input shaft 21 drivingly connected to an output shaft (not illustrated) of the engine 2 through a damper device (not illustrated); a motive power distribution planetary gear PR1; an engine counter shaft 25 serving as a third rotation shaft; a connecting shaft 22; a first motor generator (hereinafter simply referred to as a "first motor") MG1, which is a first rotary electric machine; and a first rotor shaft 23, which is an output shaft of the first motor MG1. The first motor MG1 includes: a stator 3S, which is a stator secured to and supported by the main case 11; and a rotor 3R, which is a rotor that rotates at a location radially inward of the stator 3S. The rotor 3R and the first rotor shaft 23 are secured to each other. The first rotor shaft 23 is rotatably supported by: a ball bearing B1 disposed so as to be fitted to an inner periphery of a support portion 11a of the main case 11; and a ball bearing B2 disposed so as to be fitted to an inner periphery of a support portion 13b (second support portion) of the center support 13.

The motive power distribution planetary gear PR1 includes: a sun gear S, which is a second rotary element; a ring gear R, which is a third rotary element; and a carrier CR, which is a first rotary element. The carrier CR supports a pinion gear P in mesh with the sun gear S and the ring gear R, such that the pinion gear P is rotatable. The carrier CR is drivingly connected to the input shaft 21, which means that the carrier CR is drivingly connected to the engine 2. The sun gear S is drivingly connected to the first rotor shaft 23 through the connecting shaft 22, which means that the sun gear S is drivingly connected to the first motor MG1. The ring gear R is integral with an inner periphery of the engine counter shaft 25. An outer periphery of the engine counter shaft 25 is provided with a third gear G3. The third gear G3 includes a herringbone gear including a pair of helical teeth whose tooth traces are opposite to each other relative to an axial direction. The engine counter shaft 25 is rotatably supported by: a ball bearing B3 disposed so as to be fitted to an outer periphery of the support portion 13b of the center support 13; and a ball bearing B4 disposed so as to be fitted to an outer periphery of a support portion 12a of the housing case 12.

Disposed on the first axis AX1 are: a second motor generator (hereinafter simply referred to as a "second motor") MG2, which is a second rotary electric machine; and a second rotor shaft 31 serving as a first rotation shaft, which is an output shaft of the second motor MG2. Unlike, for example, the hybrid drive apparatus disclosed in JP 2013-23036 A, the second rotor shaft 31 does not include two shafts but includes a single shaft. The second rotor shaft 31 is rotatably supported by: a ball bearing B7 disposed so as to be fitted to an inner periphery of a support portion llb of the main case 11; and a ball bearing B8 disposed so as to be fitted to an inner periphery of a support portion 12c of the housing case 12. An outer periphery of the second rotor shaft 31 is integrally provided with a first gear G1. The first gear G1 includes a herringbone gear including a pair of helical teeth whose tooth traces are opposite to each other relative to the axial direction.

A counter member 40 is disposed on the second axis AX2. The counter member 40 includes: an output counter shaft 41 serving as a second rotation shaft; a second gear G2 drivingly connected to an outer periphery of the output counter shaft 41; and a fourth gear G4 integral with the outer periphery of the output counter shaft 41. The second gear G2 is larger in diameter than the fourth gear G4. The locations of the fourth gear G4 and the second gear G2 on the output counter shaft 41 are different in the axial direction. In the present embodiment, the second gear G2 is disposed closer to the plate portion 13a of the center support 13 than the fourth gear G4 in the axial direction.

The output counter shaft 41 is rotatably supported by: a roller bearing B5 disposed so as to be fitted to an inner periphery of a support portion 13c (first support portion) of the center support 13; and a roller bearing B6 disposed so as to be fitted to an inner periphery of a support portion 12c of the housing case 12. The second gear G2 includes a herringbone gear including a pair of helical teeth whose tooth traces are opposite to each other relative to the axial direction. The second gear G2 is in mesh with each of the first gear G1 and the third gear G3. The fourth gear G4 also includes a herringbone gear including a pair of helical teeth whose tooth traces are opposite to each other relative to the axial direction.

A differential device 50 is disposed on the fourth axis AX4. The differential device 50 includes: a differential case 51 including a left cylindrical portion 51L and a right cylindrical portion 51R; and a fifth gear G5 (differential ring gear) secured to an outer periphery of the differential case 51. An operating gear device (not illustrated) is incorporated into the differential case 51. The operating gear device is drivingly connected to right and left drive shafts (not illustrated). The right and left drive shafts are respectively drivingly connected to right and left wheels. The left cylindrical portion 51L is rotatably supported by a tapered roller bearing B9 disposed so as to be fitted to an inner periphery of a support portion 11c of the main case 11. The right cylindrical portion 51R is rotatably supported by a tapered roller bearing B10 disposed so as to be fitted to an inner periphery of a support portion 12d of the housing case 12. The differential case 51 is thus supported by the case 10 so as to be rotatable relative to the case 10. The fifth gear G5 includes a herringbone gear including a pair of helical teeth whose tooth traces are opposite to each other relative to the axial direction. The fifth gear G5 is in mesh with the fourth gear G4.

Operations of Hybrid Drive Apparatus according to First Embodiment

Operations of the hybrid drive apparatus $1_1$ according to the first embodiment will now be described with reference to FIG. 1. During hybrid travel that involves starting the engine 2, driving rotation of the engine 2 is input from the input shaft 21 to the carrier CR of the motive power distribution planetary gear PR1. A portion of the driving rotation input to the carrier CR is transmitted to the first motor MG1 through the sun gear S, the connecting shaft 22, and the first rotor shaft 23 and then subjected to regeneration by the first motor MG1 such that a battery (not illustrated) is charged with the resulting electric power (or the electric power is directly supplied to the second motor MG2). Regeneration by the first motor MG1 provides a regenerative torque to the sun gear S. The remaining driving rotation input to the carrier CR is thus transmitted to the second gear G2 of the counter member 40 through the ring gear R, the engine counter shaft 25, and the third gear G3. In short, a driving force from the engine 2 is distributed to the first motor MG1 and the counter member 40 (or the third gear G3) through the motive power distribution planetary gear PR1.

When necessary, the second motor MG2 outputs an assist torque in accordance with a required driving force responsive to, for example, an accelerator operation amount. The driving force is transmitted to the second gear G2 of the counter member 40 through the second rotor shaft 31 and the first gear G1. The driving rotation input to the second gear G2 of the counter member 40 is transmitted to the fifth gear G5 through the output counter shaft 41 and the fourth gear G4 and then output to the right and left wheels while a rotation difference between the right and left wheels is adjusted by the differential device 50.

During EV travel driving time that involves stopping driving of the engine 2, the driving rotation of the second motor MG2 is transmitted to the second gear G2 of the counter member 40 through the second rotor shaft 31 and the first gear G1, further transmitted to the fifth gear G5 through the output counter shaft 41 and the fourth gear G4, and then output to the right and left wheels through the differential device 50. In this case, the rotation of the second gear G2 rotates the third gear G3 so as to rotate the ring gear R through the engine counter shaft 25; however, the sun gear S and the first motor MG1 idle because the carrier CR is stationary owing to stoppage of the engine 2. During EV travel non-driving time, a driving force is transmitted from the differential device 50 in a direction opposite to that during the driving time, and the driving force is regenerated by the second motor MG.

Steps for Manufacturing Hybrid Drive Apparatus according to First Embodiment

Figure 2:
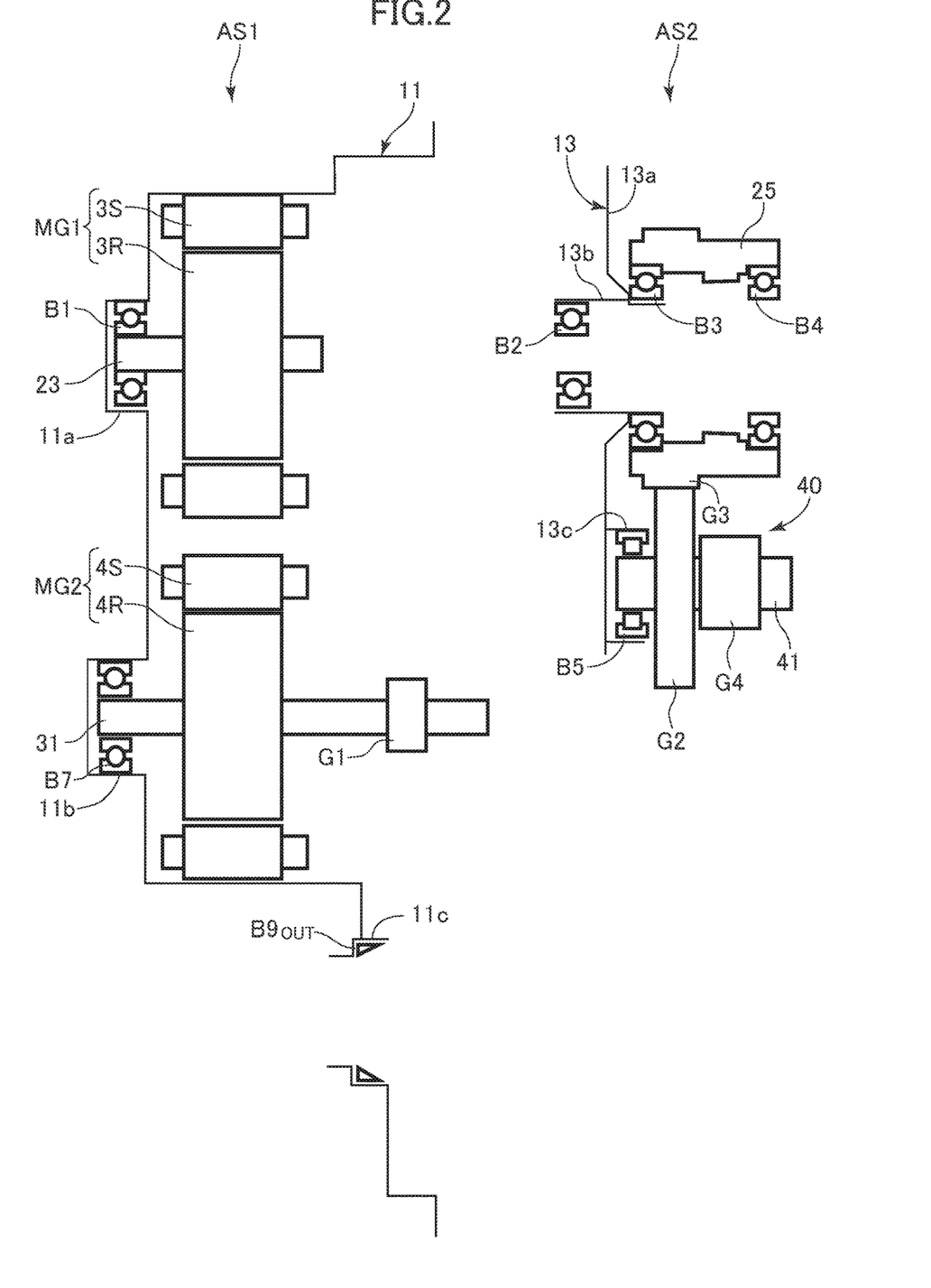
FIG. 2 is a schematic cross-sectional view illustrating a first assembly and a second assembly in a pre-assembly state during manufacture of the hybrid drive apparatus.

Steps for manufacturing the hybrid drive apparatus $1_1$ according to the first embodiment will now be described with reference to FIGS. 2 to 5. In FIGS. 2 and 5, the main case 11 is illustrated as being disposed in the left portions of FIGS. 2 and 5. In the manufacturing steps described below, however, the main case 11 is disposed at a low position, and components are assembled to the main case 11 from above.

First, as illustrated in FIG. 2, a first assembly fabricating step (first step) involves assembling the ball bearing B1 to the support portion 11a of the main case 11 and fitting the first rotor shaft 23 to the ball bearing B1 so as to assemble the first motor MG1, whose first rotor shaft 23 is secured to the rotor 3R, to the main case 11. The first step further involves assembling the ball bearing B7 to the support portion 11b of the main case 11 and fitting the second rotor shaft 31 to the ball bearing B7 so as to assemble the second motor MG2, whose second rotor shaft 31 including the first gear G1 is secured to a rotor 4R, to the main case 11. The first step also involves fitting and assembling an outer race B9out of the tapered roller bearing B9 to the support portion 11c of the main case 11. The first step thus provides a first assembly AS1 including the first rotor shaft 23, the first motor MG1, the second rotor shaft 31, the second motor MG2, and the first gear G1 assembled to the main case 11.

Next, a second assembly fabricating step (second step) involves, at a location different from that for the first assembly AS1, assembling the ball bearing B2 and the ball bearing B3 to the support portion 13b of the center support 13 and fitting the engine counter shaft 25, which has the ball bearing B4 fitted thereto, to the ball bearing B3 so as to assemble the engine counter shaft 25 to the center support 13. The second step further involves fitting the roller bearing B5 to the support portion 13c of the center support 13 and fitting the output counter shaft 41 to the roller bearing B5 while causing the second gear G2 (which is a herringbone gear) to mesh with the third gear G3 (which is also a herringbone gear) in a radial direction so as to assemble the output counter shaft 41 to the center support 13. The second step thus provides a second assembly AS2 including the engine counter shaft 25 and the counter member 40 assembled to the center support 13.

Then, a first assembly and second assembly assembling step (third step) involves assembling the second assembly AS2 to the first assembly AS1 such that the ball bearing B2 is fitted to the first rotor shaft 23, with the counter member 40 located opposite to the first motor MG1 in the axial direction (i.e., with the plate portion 13a of the center support 13 of the second assembly AS2 located between the first motor MG1 and the counter member 40). In other words, the third step involves disposing the second assembly AS2 such that the plate portion 13a of the center support 13 covers the first motor MG1 of the first assembly AS1.

Figure 3A:
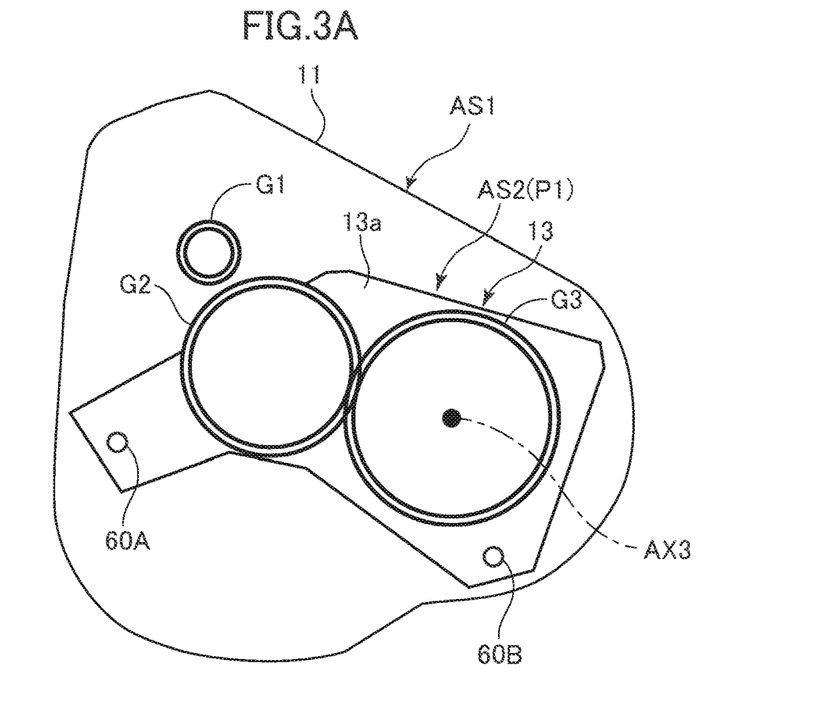
FIG. 3A is an axial view illustrating the second assembly located at a first position during manufacture of the hybrid drive apparatus.
Figure 3B:
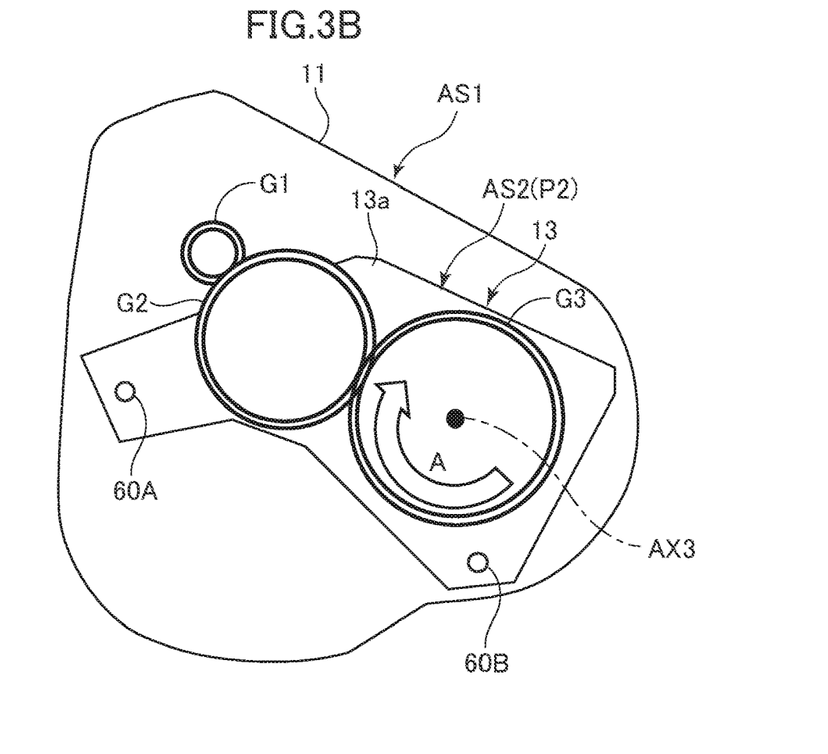
FIG. 3B is an axial view illustrating the second assembly located at a second position during manufacture of the hybrid drive apparatus.

During this step, the second assembly AS2 (or the center support 13) is rotatable around the third axis AX3 as illustrated in FIGS. 3A and 3B because the ball bearing B2 is fitted to the first rotor shaft 23 (see FIG. 2). When the second assembly AS2 is initially set on the first assembly AS1, the second assembly AS2 is set at a first position P1 where the first gear G1 and the second gear G2 are located away from each other as illustrated in FIG. 3A. The second assembly AS2 is subsequently rotated from the first position P1 illustrated in FIG. 3A, such that the second assembly AS2 is rotated around the third axis AX3 in a direction indicated by an arrow A as illustrated in FIG. 3B. This brings the second gear G2 close to the first gear G1 in a radial direction of the first gear G1. The second assembly AS2 is thus moved to a second position P2 where the second gear G2 is in mesh with the first gear G1. The second assembly AS2 is then secured at the second position P2 in the direction of rotation with respect to the first assembly AS1 by using positioning pin mechanisms 60A and 60B at two locations each situated in both of the main case 11 and the center support 13. This finishes the assembling of the second assembly AS2 to the first assembly AS1.

Figure 4A:
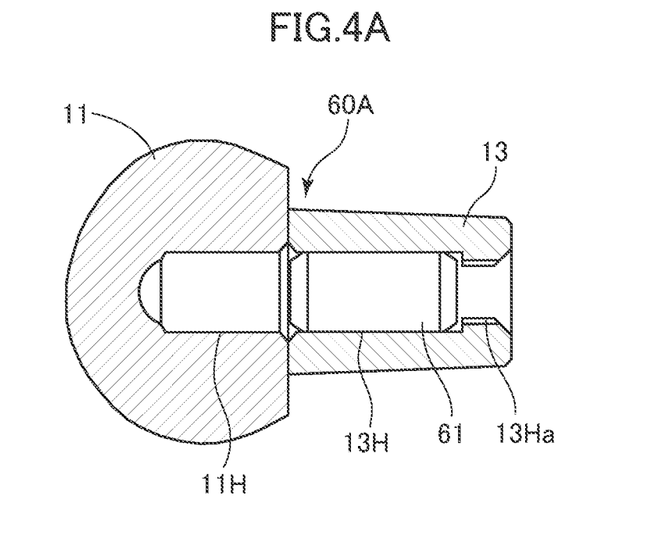
FIG. 4A is a cross-sectional view illustrating a positioning pin housed in a housing hole of a center support.

The structures of the positioning pin mechanisms 60A and 60B serving as positioning members will now be described. Because the positioning pin mechanisms 60A and 60B are similar in structure, the following description discusses the positioning pin mechanism 60A, and the positioning pin mechanism 60B will not be described. As illustrated in FIG. 4A, the positioning pin mechanism 60A includes: a pin 61; a housing hole 13H which is defined in the center support 13 and in which the pin 61 is housed; a fitting hole 11H defined in the main case 11; and a bolt 62 serving as a protrusion member to cause the pin 61 to protrude from the housing hole 13H. An internal thread 13Ha is cut on a portion of the center support 13 that is located opposite to the main case 11 and defines an opening in communication with the housing hole 13H. The positioning pin mechanism 60A is structured such that, with the pin 61 housed in the housing hole 13H, screwing an external thread 62a of the bolt 62 to the internal thread 13Ha moves an end of the bolt 62 so as to cause the pin 61 to protrude from the housing hole 13H. A distance by which the pin 61 is to be protruded is determined in accordance with the length of the bolt 62. In the present embodiment, the length of the bolt 62 is decided such that the pin 61 protrudes by about half the length of the pin 61.

Figure 4B:
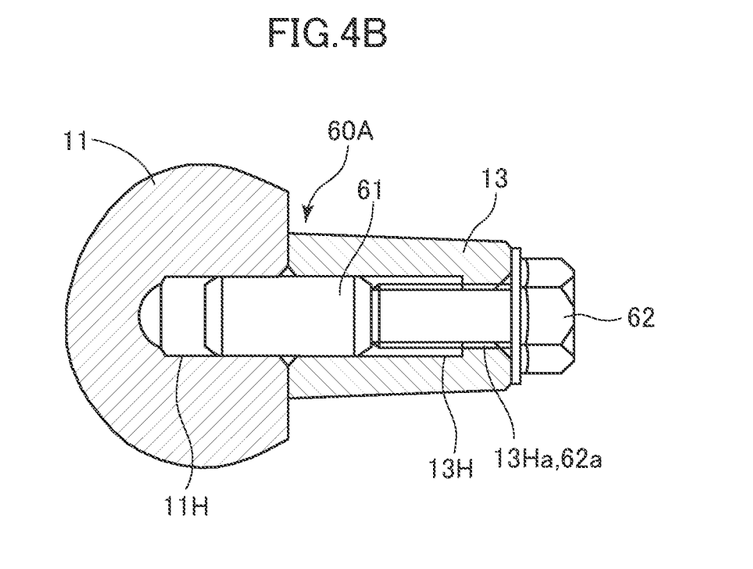
FIG. 4B is a cross-sectional view illustrating the positioning pin set at a positioning position.

The pin 61 is housed in the housing hole 13H immediately after the second assembly AS2 is rotated to the first position P1 (see FIG. 3A) or the second position P2 (see FIG. 3B) as previously mentioned. When the second assembly AS2 is positioned at the second position P2 with respect to the first assembly AS1 by using the positioning pin mechanism 60A, the bolt 62 is screwed to the internal thread 13Ha as described above. This causes the pin 61 to protrude from the housing hole 13H so as to fit the protruded portion of the pin 61 to the fitting hole 11H of the main case 11 as illustrated in FIG. 4B. The pin 61 is thus disposed in both of the main case 11 and the center support 13 such that the second assembly AS2 is positioned with respect to the first assembly AS1. The bolt 62 may be removable. In such a case, however, vibrations, for example, may cause the pin 61 to move and return to the housing hole 13H. Accordingly, the present embodiment involves keeping the bolt 62 fastened to the center support 13.

Figure 5A:
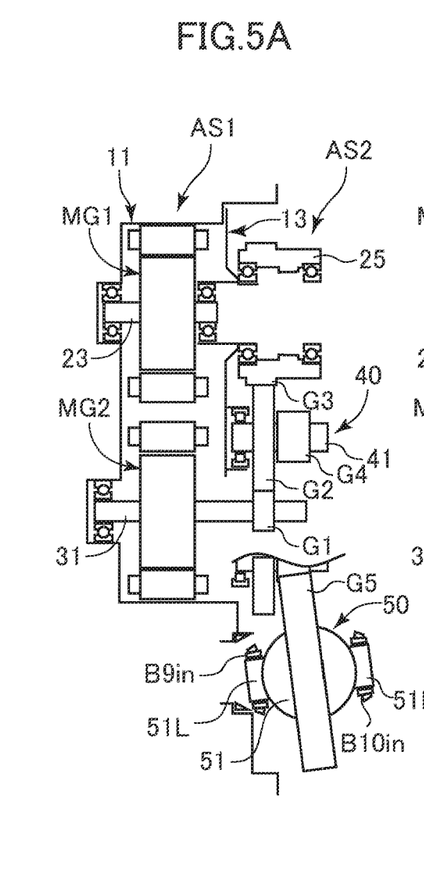
FIG. 5A is a schematic cross-sectional view illustrating a differential device in the course of being assembled during manufacture of the hybrid drive apparatus.
Figure 5B:
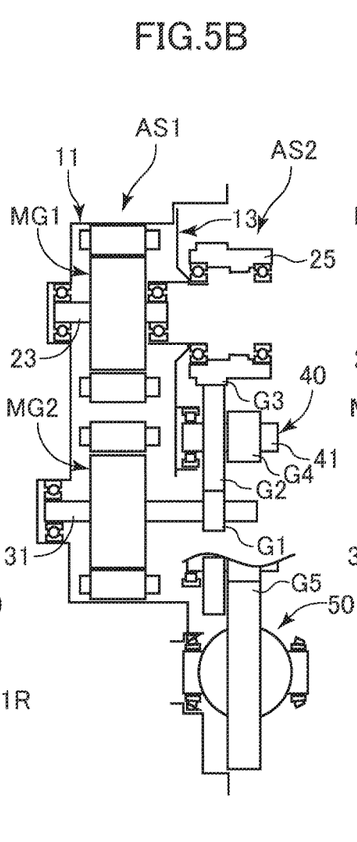
FIG. 5B is a schematic cross-sectional view illustrating the differential device after being assembled during manufacture of the hybrid drive apparatus.

Next, a differential device assembling step involves, with the second assembly AS2 assembled to the first assembly AS1, causing the fifth gear G5 to mesh with the fourth gear G4 in its radial direction while inclining the differential device 50 (or the fifth gear G5), with the left and right cylindrical portions 51L and 51R of the differential case 51 respectively fitted to inner races B9in and B10in of the tapered roller bearings B9 and B10 as illustrated in FIG. 5A. The differential device 50 is thus assembled to the first assembly AS1 and the second assembly AS2 as illustrated in FIG. 5B.

Figure 5C:
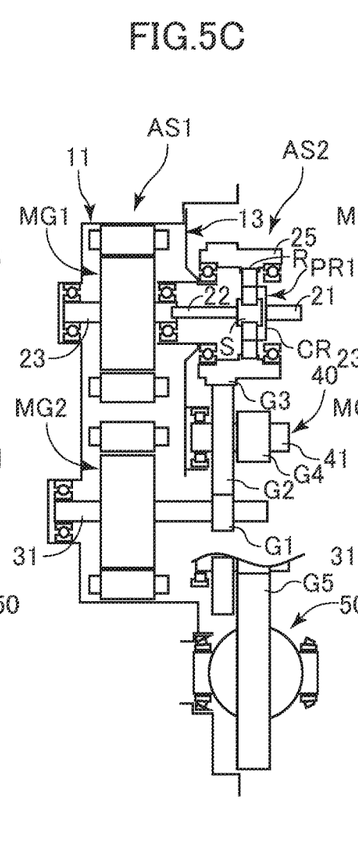
FIG. 5C is a schematic cross-sectional view illustrating a motive power distribution planetary gear after being assembled during manufacture of the hybrid drive apparatus.

Then, a motive power distribution planetary gear assembling step involves assembling the motive power distribution planetary gear PR1 to the second assembly AS2 together with the connecting shaft 22 (which is provided with the sun gear S) and the input shaft 21 (which is drivingly connected to the carrier CR through, for example, a spline) as illustrated in FIG. 5C. The present embodiment is described on the assumption that the ring gear R is integral with the engine counter shaft 25. Alternatively, the ring gear R may be a component separate from the engine counter shaft 25 and may be brought into engagement with the engine counter shaft 25 through, for example, a spline.

Figure 5D:
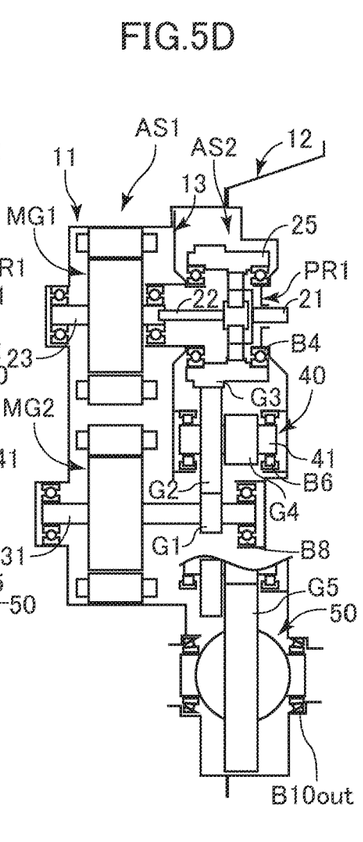
FIG. 5D is a schematic cross-sectional view illustrating a housing case after being assembled during manufacture of the hybrid drive apparatus.

Then, a main case and housing case assembling step (fourth step) involves assembling the housing case 12 (which has the roller bearing B6, the ball bearing B8, and an outer race B10out of the tapered roller bearing B10 fitted to the associated support portions) to the main case 11, with the first assembly AS1, the second assembly AS2, the differential device 50, and the motive power distribution planetary gear PR1 assembled to the main case 11 as illustrated in FIG. 5D. This finishes all of the steps for manufacturing the hybrid drive apparatus $1_1$, which means that the hybrid drive apparatus $1_1$ is completed.

As described above, the manufacturing steps (which are included in a manufacturing method) for the hybrid drive apparatus $1_1$ involve fabricating the first assembly AS1 and the second assembly AS2 separately. Thus, if the second assembly AS2, in particular, includes the second gear G2 and the third gear G3 each including a herringbone gear, the second gear G2 and the third gear G3 would be allowed to mesh with each other in the radial direction so as to enable assembly thereof. Assembling the second assembly AS2 to the first assembly AS1 involves rotating the second assembly AS2 from the first position P1 to the second position P2 so as to cause the first gear G1 and the second gear G2 to mesh with each other. Accordingly, if the first gear G1 and the second gear G2 each include a herringbone gear, the first gear G1 and the second gear G2 would be allowed to mesh with each other in the radial direction so as to enable assembly thereof.

If the fourth gear G4 and the fifth gear G5 each include a herringbone gear, assembling the differential device 50 to the second assembly AS2 afterward would allow the fourth gear G4 and the fifth gear G5 to mesh with each other in the radial direction so as to enable assembly thereof. Although the second gear G2, in particular, is larger in diameter than the fourth gear G4, the second gear G2 is disposed closer to the first motor MG1 than the fourth gear G4 in the axial direction. Thus, when the second gear G2 and the fourth gear G4, for example, are located opposite to each other in the axial direction, the second gear G2 secured to the main case 11 may interfere with the fifth gear G5, making it difficult to assemble the fifth gear G5 to the fourth gear G4. The manufacturing method, however, enables assembling of the differential device 50 to the first assembly AS1 and the second assembly AS2 without bringing about such a situation.

The step of fabricating the first assembly AS1 and the step of fabricating the second assembly AS2 are performed separately, and the step of assembling the differential device 50 is different from the step of assembling the second assembly AS2 to the first assembly AS1. Thus, the first assembly AS1 includes a shaft-shaped component that is the second rotor shaft 31, the second assembly AS2 includes two shaft-shaped components that are the engine counter shaft 25 and the counter member 40 (or the output counter shaft 41), and the differential device 50 functions as a single shaft-shaped component. Accordingly, if, for example, a worker is alone, he or she does not have to handle three or more shaft-shaped components at a time. Consequently, the manufacturing method is able to facilitate operations during assembly while eliminating the need for a large jig or a dedicated facility.

In the present embodiment, the first gear G1, the second gear G2, the third gear G3, the fourth gear G4, and the fifth gear G5 each include a herringbone gear. The first to fifth gears G1 to G5, however, are allowed to mesh with the associated gears in different steps as previously described. Accordingly, the present embodiment makes it unnecessary to perform an operation for causing two or more meshing parts to mesh with each other simultaneously, thus facilitating operations during assembly. The present embodiment further makes it possible to eliminate the need to cause each gear to mesh with the associated gear in the axial direction. Consequently, the present embodiment enables each gear to mesh with the associated gear in the radial direction so as to enable assembly of the gears themselves.

Axial Positional Relationships Determined by Bearings and Herringbone Gears

The following description discusses the axial positional relationships among the differential device 50, the counter member 40, the second motor MG2, and the engine counter shaft 25, which are determined by the first to fifth gears G1 to G5. As illustrated in FIG. 1, the left and right cylindrical portions 51L and 51R of the differential case 51 are respectively rotatably supported by the tapered roller bearings B9 and B10, and the positioning of the differential device 50 is thus effected such that the differential device 50 is immovable in the axial direction. The positioning of the differential device 50 in the axial direction is effected by the tapered roller bearings B9 and B10 such that the differential device 50 is unaffected by external forces applied from the drive shafts (not illustrated). Examples of the external forces include: a thrust force from the drive shafts; and an axial force caused by drive shaft insertion during assembly. The tapered roller bearing B9, supporting the differential device 50 such that the differential device 50 is rotatable, includes inclined rollers. Thus, the differential device 50 would be assembled while being inclined (see FIG. 5A) during assembly if the fourth gear G4 and the fifth gear G5 each include a herringbone gear. Accordingly, the fourth gear G4 and the fifth gear G5 are allowed to mesh with each other.

Performing the positioning of the differential device 50 in the axial direction in the above-described manner causes the fifth gear G5 and the fourth gear G4, which are herringbone gears, to mesh with each other, effecting the positioning of the counter member 40 (or the output counter shaft 41) such that the counter member 40 (or the output counter shaft 41) is immovable in the axial direction. Thus, if there is an error caused by component tolerance of the differential device 50 and/or the counter member 40, the roller bearings B5 and B6 would allow a certain degree of movement in the axial direction. If, for example, the roller bearings B5 and B6 are replaced with bearings (such as tapered roller bearings) that restrict axial positions, the component tolerance of the differential device 50 and the counter member 40 causes application of load on the meshing portions of the fifth gear G5 and the fourth gear G4, which are herringbone gears. Such load generates noise or affects durability. To prevent occurrence of such a phenomenon, the roller bearings B5 and B6 are able to make an adjustment so as to allow an error caused by the component tolerance.

Because the second gear G2 and the first gear G1, which are herringbone gears, mesh with each other in a manner similar to that described above, an error caused by manufacturing tolerance of the counter member 40 also affects the second rotor shaft 31. The ball bearings B7 and B8, however, allow a certain degree of movement in the axial direction, which means that the ball bearings B7 and B8 are able to make an adjustment so as to allow an error caused by the component tolerance. The axial position of the rotor 4R secured to the second rotor shaft 31 may slightly deviate with respect to the axial position of a stator 4S. Such a slight deviation, however, will not greatly affect the performance of the second motor MG2.

Because the second gear G2 and the third gear G3, which are herringbone gears, mesh with each other in a manner similar to that described above, an error caused by the manufacturing tolerance of the counter member 40 also affects the engine counter shaft 25. The ball bearings B3 and B4, however, allow a certain degree of movement in the axial direction, which means that the ball bearings B3 and B4 are able to make an adjustment so as to allow an error caused by the component tolerance. In the present embodiment, the tooth surfaces of the sun gear S, the pinion gear P, and the ring gear R of the motive power distribution planetary gear PR1 include helical teeth. Accordingly, if the axial position of the ring gear R slightly deviates in accordance with the axial position of the engine counter shaft 25, this slight deviation would not affect the motive power distribution planetary gear PR1.

In the present embodiment, the output counter shaft 41 is rotatably supported by the roller bearings B5 and B6. Alternatively, these roller bearings may be replaced with ball bearings. The second rotor shaft 31 is rotatably supported by the ball bearings B7 and B8, and the engine counter shaft 25 is rotatably supported by the ball bearings B3 and B4. Alternatively, these ball bearings may be replaced with roller bearings.

Second Embodiment

Figure 6:
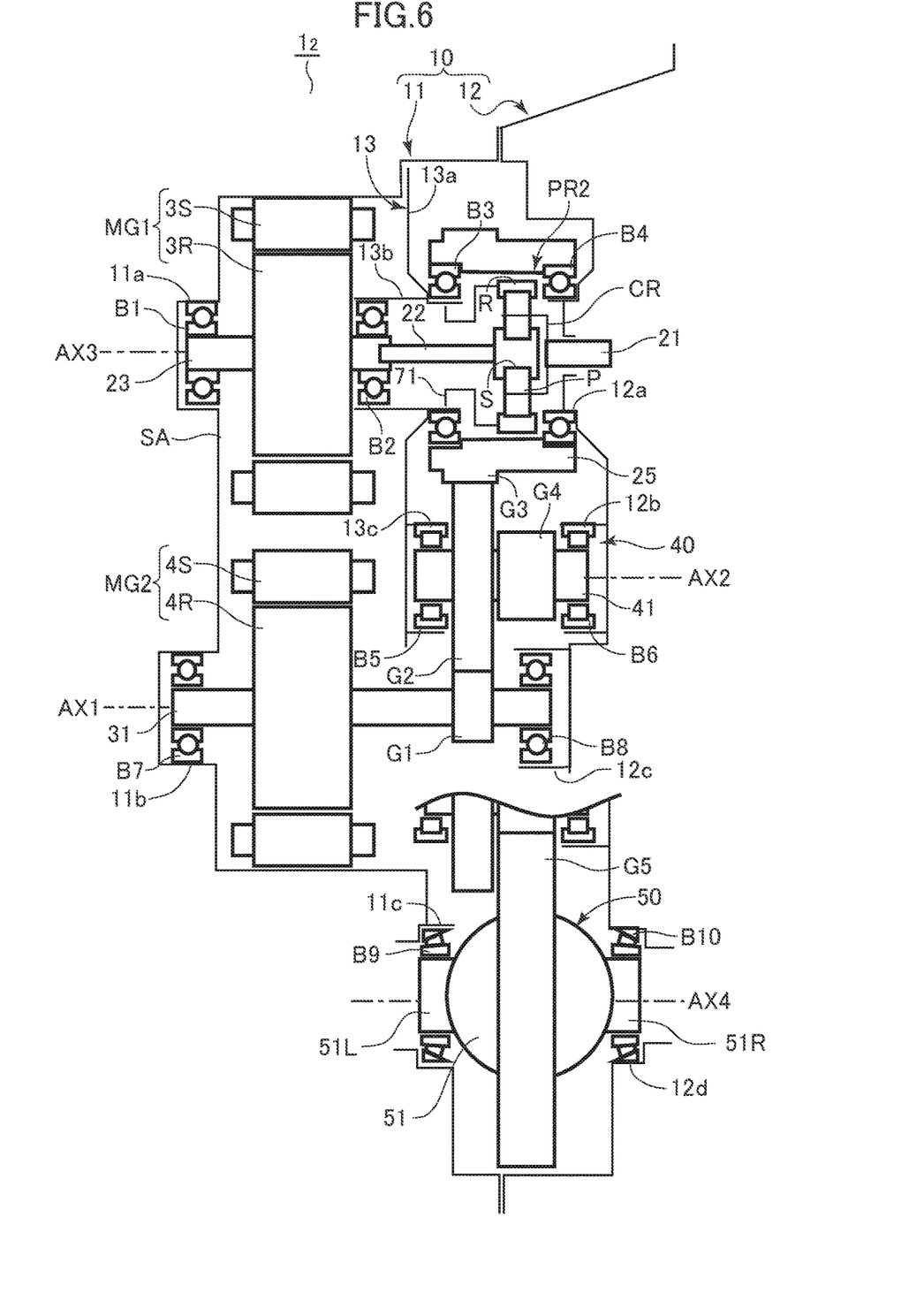
FIG. 6 is a schematic cross-sectional view illustrating a hybrid drive apparatus according to a second embodiment.

A second embodiment, which is a partial modification of the first embodiment, will now be described with reference to FIG. 6. In the description of the second embodiment, components similar to those in the first embodiment are identified by the same reference characters and will thus not be described.

Unlike the first embodiment, a hybrid drive apparatus $1_2$ according to the second embodiment includes a speed change planetary gear PR2 instead of the motive power distribution planetary gear PR1. Specifically, the speed change planetary gear PR2 includes: the carrier CR drivingly connected to the input shaft 21; the sun gear S drivingly connected to the first motor MG1 through the connecting shaft 22 and the first rotor shaft 23; and the ring gear R secured to the center support 13 (or the case 10) through a connecting member 71.

The hybrid drive apparatus $1_2$ thus provided is to be used in a series type hybrid vehicle. The hybrid drive apparatus $1_2$ basically outputs a driving force from the second motor MG2 to the wheels through the counter member 40 and the differential device 50 or regenerates rotation of the wheels by using the second motor MG2 through the counter member 40 and the differential device 50. When the amount of charge in a battery (not illustrated) is insufficient, the engine 2 is started so as to regenerate driving rotation of the engine 2 by using the first motor MG1 through the speed change planetary gear PR2, thus charging the battery. During this process, the driving rotation of the engine 2 input to the carrier CR from the input shaft 21 is increased in speed by the sun gear S, with the ring gear R held stationary, and then output to the first motor MG1. In other words, the rotation of the engine 2 is changed in speed by the speed change planetary gear PR2 and then transmitted to the first motor MG1.

Similarly to the first embodiment, a method for manufacturing the above-described hybrid drive apparatus $1_2$ according to the second embodiment involves: fabricating the first assembly AS1 and the second assembly AS2 separately; assembling the second assembly AS2 to the first assembly AS1 such that the second assembly AS2 is located at the first position P1; and rotating the second assembly AS2 to the second position P2 so as to perform positioning of the second assembly AS2 by using the positioning pin mechanisms 60A and 60B. The manufacturing method then involves: assembling the differential device 50 to the first assembly AS1 and the second assembly AS2; assembling the connecting shaft 22, the speed change planetary gear PR2, and the input shaft 21 to the second assembly AS2; and assembling the housing case 12 to the main case 11. Accordingly, if, for example, a worker is alone, he or she does not have to handle three or more shaft-shaped components at a time. Consequently, the manufacturing method is able to facilitate operations during assembly while eliminating the need for a large jig or a dedicated facility.

Components, operations, and effects of the second embodiment other than those described above are similar to those of the first embodiment and will thus not be described.

Third Embodiment

Figure 7:
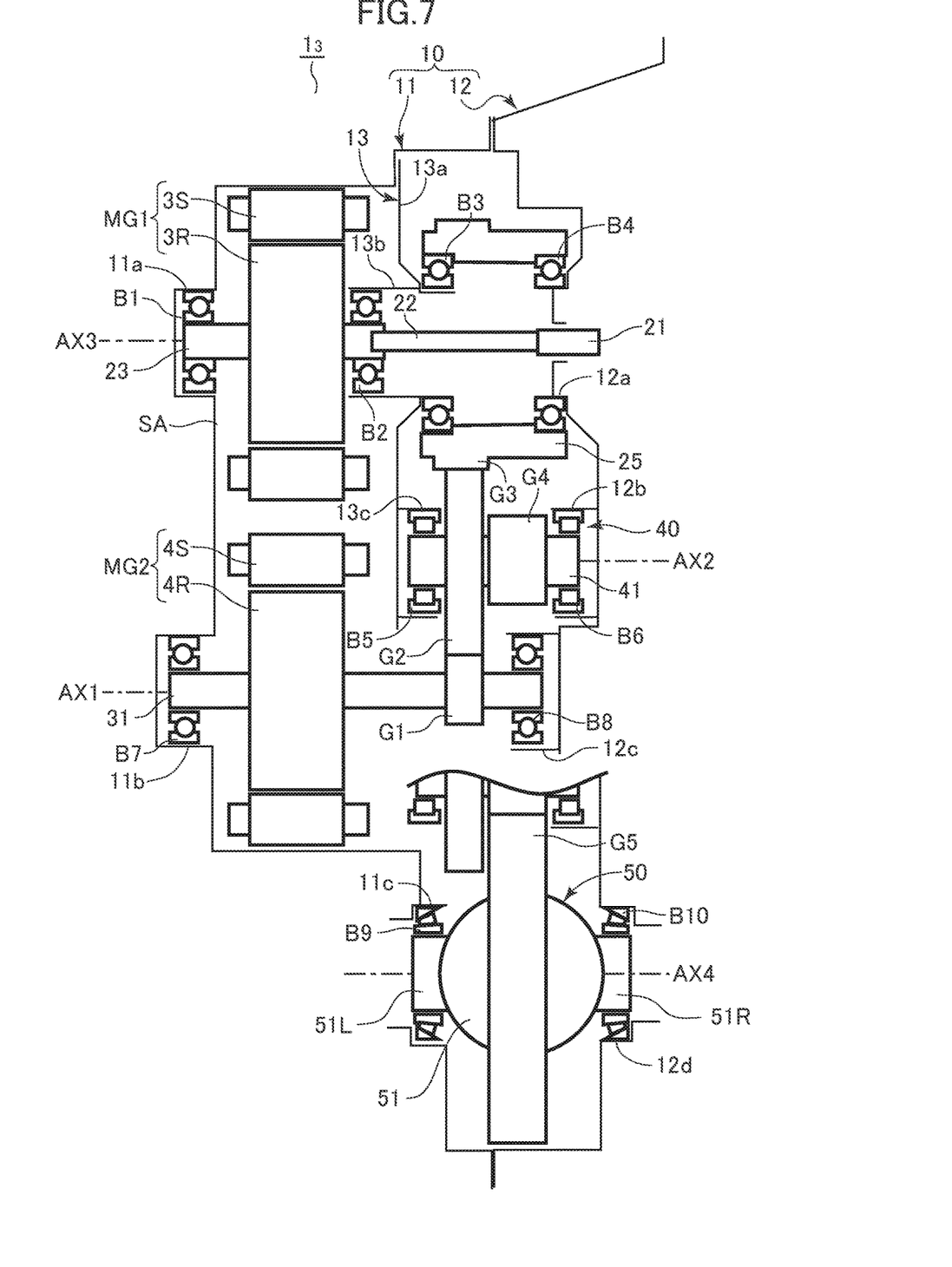
FIG. 7 is a schematic cross-sectional view illustrating a hybrid drive apparatus according to a third embodiment.

A third embodiment, which is a partial modification of the first embodiment, will now be described with reference to FIG. 7. In the description of the third embodiment, components similar to those in the first embodiment are identified by the same reference characters and will thus not be described.

Unlike the first embodiment, a hybrid drive apparatus $1_3$ according to the third embodiment includes no motive power distribution planetary gear PR1 such that the input shaft 21 and the connecting shaft 22 are drivingly connected to each other directly.

The hybrid drive apparatus $1_3$ thus provided is to be used in a series type hybrid vehicle. The hybrid drive apparatus $1_3$ basically outputs a driving force from the second motor MG2 to the wheels through the counter member 40 and the differential device 50 or regenerates rotation of the wheels by using the second motor MG2 through the counter member 40 and the differential device 50. When the amount of charge in a battery (not illustrated) is insufficient, the engine 2 is started so as to regenerate driving rotation of the engine 2 by using the first motor MG1, thus charging the battery.

Similarly to the first embodiment, a method for manufacturing the above-described hybrid drive apparatus $1_3$ according to the third embodiment involves: fabricating the first assembly AS1 and the second assembly AS2 separately; assembling the second assembly AS2 to the first assembly AS1 such that the second assembly AS2 is located at the first position P1; and rotating the second assembly AS2 to the second position P2 so as to perform positioning of the second assembly AS2 by using the positioning pin mechanisms 60A and 60B. The manufacturing method then involves: assembling the differential device 50 to the first assembly AS1 and the second assembly AS2; assembling the connecting shaft 22 and the input shaft 21 to the second assembly AS2; and assembling the housing case 12 to the main case 11. Accordingly, if, for example, a worker is alone, he or she does not have to handle three or more shaft-shaped components at a time. Consequently, the manufacturing method is able to facilitate operations during assembly while eliminating the need for a large jig or a dedicated facility.

Components, operations, and effects of the third embodiment other than those described above are similar to those of the first embodiment and will thus not be described.

Fourth Embodiment

Figure 8:
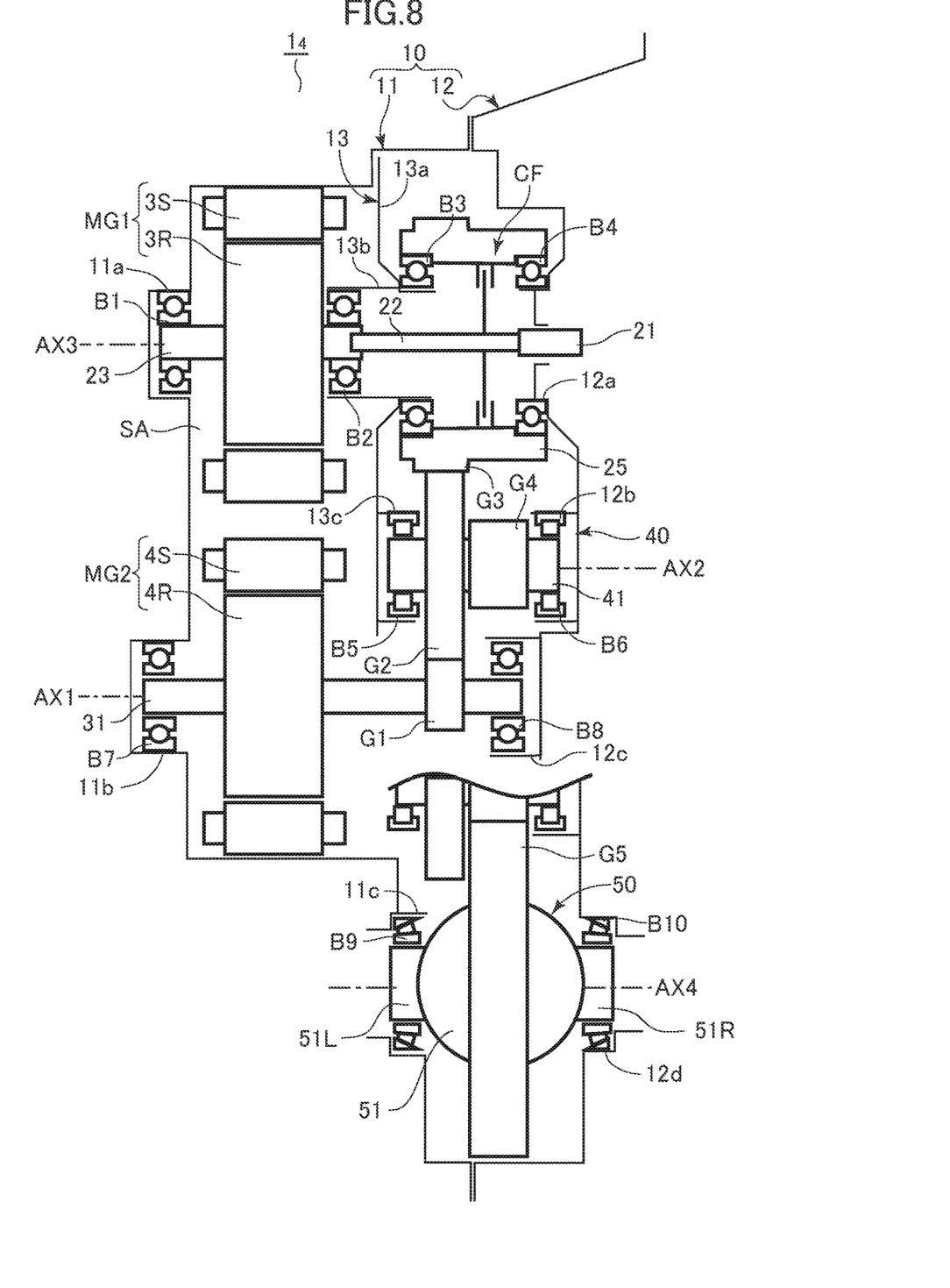
FIG. 8 is a schematic cross-sectional view illustrating a hybrid drive apparatus according to a fourth embodiment.

A fourth embodiment, which is a partial modification of the first and third embodiments, will now be described with reference to FIG. 8. In the description of the fourth embodiment, components similar to those in the first and third embodiments are identified by the same reference characters and will thus not be described.

Unlike the first embodiment, a hybrid drive apparatus $1_4$ according to the fourth embodiment includes no motive power distribution planetary gear PR1 such that the input shaft 21 and the connecting shaft 22 are drivingly connected to each other directly, and includes an engine connecting clutch CF functioning as a clutch device that is able to connect the engine 2 (or the connecting shaft 22) and the engine counter shaft 25 so as to transmit motive power therebetween. In other words, unlike the third embodiment, the hybrid drive apparatus $1_4$ according to the fourth embodiment includes the engine connecting clutch CF that is able to connect the engine 2 (or the connecting shaft 22) and the engine counter shaft 25 so as to transmit motive power therebetween.

The hybrid drive apparatus $1_4$ thus provided is to be used in a series-parallel type hybrid vehicle. When the engine connecting clutch CF is in a disengaged state, the hybrid drive apparatus $1_4$ basically outputs a driving force from the second motor MG2 to the wheels through the counter member 40 and the differential device 50 or regenerates rotation of the wheels by using the second motor MG2 through the counter member 40 and the differential device 50. When the amount of charge in a battery (not illustrated) is insufficient, the engine 2 is started so as to regenerate driving rotation of the engine 2 by using the first motor MG1, thus charging the battery. When a change in the speed of rotation of the engine 2 is unnecessary, e.g., when the vehicle travels at high speed, the engine connecting clutch CF is engaged so as to transmit the driving rotation of the engine 2 to the wheels through the counter member 40 and the differential device 50, thus carrying out "engine travel". During the engine travel, the second motor MG2 may assist the vehicle to travel or may carry out regeneration.

Similarly to the first and third embodiments, a method for manufacturing the above-described hybrid drive apparatus $1_4$ according to the fourth embodiment involves: fabricating the first assembly AS1 and the second assembly AS2 separately; assembling the second assembly AS2 to the first assembly AS1 such that the second assembly AS2 is located at the first position P1; and rotating the second assembly AS2 to the second position P2 so as to perform positioning of the second assembly AS2 by using the positioning pin mechanisms 60A and 60B. The manufacturing method then involves: assembling the differential device 50 to the first assembly AS1 and the second assembly AS2; assembling the connecting shaft 22 and the input shaft 21 to the second assembly AS2; and assembling the housing case 12 to the main case 11. Accordingly, if, for example, a worker is alone, he or she does not have to handle three or more shaft-shaped components at a time. Consequently, the manufacturing method is able to facilitate operations during assembly while eliminating the need for a large jig or a dedicated facility.

Components, operations, and effects of the fourth embodiment other than those described above are similar to those of the first and third embodiments and will thus not be described.

Summary of First to Fourth Embodiments

The present disclosure provides a vehicle drive apparatus ($1_1$, $1_2$, $1_3$, $1_4$) including:

a case (10) including a first case member (11) and a second case member (12);

a first rotation shaft (31) disposed on a first axis (AX1);

a first gear (G1) secured to the first rotation shaft (31), the first gear (G1) being a herringbone gear;

a second rotation shaft (41) disposed on a second axis (AX2) different from the first axis (AX1);

a second gear (G2) secured to the second rotation shaft (41) and in mesh with the first gear (G1), the second gear (G2) being a herringbone gear;

a third rotation shaft (25) disposed on a third axis (AX3) different from the first axis and the second axis;

a third gear (G3) secured to the third rotation shaft (25) and in mesh with the second gear (G2), the third gear (G3) being a herringbone gear;

a support member (13) including a plate portion (13a) having a plate shape, a first support portion (13c) supporting the second rotation shaft (41) such that the second rotation shaft (41) is rotatable relative to the plate portion (13a), and a second support portion (13b) supporting the third rotation shaft (25) such that the third rotation shaft (25) is rotatable relative to the plate portion (13a); and a positioning member (60A, 60B) for positioning of the support member (13) with respect to the case (10), in which assembling the first rotation shaft (31) to the first case member (11) provides a first assembly (AS1), assembling the second rotation shaft (41) and the third rotation shaft (25) to the support member (13) provides a second assembly (AS2), and with the first assembly (AS1) and the second assembly (AS2) assembled to each other, the first case member (11) and the second case member (12) are secured to each other.

In such an embodiment, the meshing portions of the first gear G1 and the second gear G2 are not allowed to mesh with each other in an axial direction, and the meshing portions of the second gear G2 and the third gear G3 are not allowed to mesh with each other in the axial direction; however, the second gear G2 and the third gear G3 are to be in mesh with each other during fabrication of the second assembly AS2 and are thus allowed to mesh with each other in a radial direction, and the first gear G1 and the second gear G2 are to be in mesh with each other during assembly of the second assembly AS2 to the first assembly AS1 and are thus allowed to mesh with each other in the radial direction. Accordingly, herringbone gears may be used to provide these gears so as to increase durability and reduce noise. If, for example, a worker is alone, he or she does not have to handle three or more shaft-shaped components at a time. Consequently, this embodiment is able to facilitate operations during assembly while eliminating the need for a large jig or a dedicated facility.

The vehicle drive apparatus ($1_1$, $1_2$, $1_3$, $1_4$) includes:

a fourth gear (G4) secured to a location on the second rotation shaft (41), the location being different from a location of the second gear (G2) in an axial direction, the fourth gear (G4) being a herringbone gear; and a differential device (50) including a fifth gear (G5) in mesh with the fourth gear (G3), the fifth gear (G5) being a herringbone gear, the differential device (50) being configured to output rotation of the fifth gear (G5) to a wheel, in which the differential device (50) is supported by a tapered roller bearing (B9, B10) such that the differential device (50) is rotatable relative to the case (10).

In such an embodiment, if herringbone gears are used to provide the fourth gear G4 and the fifth gear G5, the differential device 50 would be assembled while being inclined. This enables the third gear G3 and the fifth gear G5 to mesh with each other.

The positioning member (60A, 60B) of the vehicle drive apparatus (1₁, 1₂, 1₃, 1₄) includes:

a pin (61) having a length that allows the pin (61) to be housed in a housing hole (13H) defined in the support member (13); and a protrusion member (62) that causes the pin (61) to protrude from the housing hole (13H) such that the pin (61) is fitted into both of the housing hole (13H) and a fitting hole (11H) defined in the first case member (11).

Such an embodiment enables the pin 61 to be housed in the housing hole 13H and prevented from interfering with rotation of the second assembly AS2 until the second assembly AS2, which has been assembled at the first position P1 to the first assembly AS1, is rotated to the second position P2. With the second assembly AS2 located at the second position P2, the bolt 62 causes the pin 61 to protrude from the housing hole 13H such that the pin 61 is fitted into both of the fitting hole 11H and the housing hole 13H. This enables positioning of the second assembly AS2 at the second position P2 with respect to the first assembly AS1.

The vehicle drive apparatus (1₁) includes:

a first rotary electric machine (MG1) disposed on the third axis (AX3) and drivingly connected to an engine (2);

a second rotary electric machine (MG2) disposed on the first axis; and a motive power distribution planetary gear (PR1) disposed on the third axis (AX3), in which the motive power distribution planetary gear (PR1) includes a first rotary element (CR) drivingly connected to the engine (2), a second rotary element (S) drivingly connected to the first rotary electric machine (MG1), and a third rotary element (R) drivingly connected to the third gear (G3), and in which the motive power distribution planetary gear (PR1) distributes motive power such that a driving force from the engine (2) is distributed to the first rotary electric machine (MG1) and the third gear (G3).

Such an embodiment makes it possible to facilitate operations during assembly while eliminating the need for a large jig or a dedicated facility, although the vehicle drive apparatus may function as a split type hybrid drive apparatus.

The present disclosure provides a method for manufacturing a vehicle drive apparatus (1₁, 1₂, 1₃, 1₄) including:

a case (10) including a first case member (11) and a second case member (12);

a first rotation shaft (31) disposed on a first axis (AX1);

a first gear (G1) secured to the first rotation shaft (31), the first gear (G1) being a herringbone gear;

a second rotation shaft (41) disposed on a second axis (AX2) different from the first axis (AX1);

a second gear (G2) secured to the second rotation shaft (41) and in mesh with the first gear (G1), the second gear (G2) being a herringbone gear;

a third rotation shaft (25) disposed on a third axis (AX3) different from the first axis (AX1) and the second axis (AX2);

a third gear (G3) secured to the third rotation shaft (AX3) and in mesh with the second gear (G2), the third gear (G3) being a herringbone gear;

a support member (13) including a plate portion (13a) having a plate shape, a first support portion (13c) supporting the second rotation shaft (41) such that the second rotation shaft (41) is rotatable relative to the plate portion (13a), and a second support portion (13b) supporting the third rotation shaft (25) such that the third rotation shaft (25) is rotatable relative to the plate portion (13a); and a positioning member (60A, 60B) for positioning of the support member (13) with respect to the case (13).

The method for manufacturing the vehicle drive apparatus (i₁, 1₂, 1₃, 1₄) includes:

a first step involving assembling the first rotation shaft (31) to the first case member (11) so as to provide a first assembly (AS1);

a second step involving assembling the second rotation shaft (41) and the third rotation shaft (25) to the support member (13) so as to provide a second assembly (AS2);

a third step involving disposing the plate portion (13a) of the support member (13) such that the plate portion (13a) is located at an axial assembling position with respect to the first assembly (AS1), rotating the second assembly (AS2) around the third axis (AX3) from a first position (P1) where the first gear (G1) and the second gear (G2) are located away from each other to a second position (P2) where the first gear (G1) and the second gear (G2) are in mesh with each other, and subsequently performing positioning of the second assembly (AS2) at the second position (P2) by using the positioning member (60A, 60B), thus assembling the second assembly (AS2) to the first assembly (AS1); and a fourth step involving securing the first case member (11) and the second case member (12) to each other, with the first assembly (AS1) and the second assembly (AS2) assembled to each other.

In such an embodiment, the meshing portions of the first gear G1 and the second gear G2 are not allowed to mesh with each other in an axial direction, and the meshing portions of the second gear G2 and the third gear G3 are not allowed to mesh with each other in the axial direction; however, the second gear G2 and the third gear G3 are to be in mesh with each other during fabrication of the second assembly AS2 and are thus allowed to mesh with each other in a radial direction, and the first gear G1 and the second gear G2 are to be in mesh with each other during assembly of the second assembly AS2 to the first assembly AS1 and are thus allowed to mesh with each other in the radial direction. Accordingly, herringbone gears may be used to provide these gears so as to increase durability and reduce noise. If, for example, a worker is alone, he or she does not have to handle three or more shaft-shaped components at a time. Consequently, this embodiment is able to facilitate operations during assembly while eliminating the need for a large jig or a dedicated facility.

Possibility of Other Embodiments

The first to fourth embodiments described above are based on the assumption that herringbone gears are used to provide the first to fifth gears G1 to G5. The first to fifth gears G1 to G5, however, are not limited to herringbone gears. In one example, these gears may include helical teeth or spur teeth. Such an embodiment is also able to facilitate operations during assembly. The manufacturing method according to each of the above embodiments would be able to manufacture a hybrid drive apparatus if these gears are not allowed to mesh with the associated gears in the axial direction. Alternatively, the manufacturing method according to each of the above embodiments may allow these gears to mesh with the associated gears in the axial direction.

The first to fourth embodiments have been described above on the assumption that the positioning pin mechanisms 60A and 60B, each of which causes the pin 61 to protrude with the bolt 62, are used as the positioning members for positioning of the first assembly AS1 and the second assembly AS2. The positioning members, however, are not limited to the positioning pin mechanisms 60A and 60B. Alternatively, any other positioning members that enable positioning of the first assembly AS1 and the second assembly AS2 may be used.

The first to fourth embodiments each involve using a tapered roller bearing as an exemplary bearing supporting a target member such that the target member is rotatable while its movement in the axial direction is restricted. Alternatively, any other bearing that has functions similar to those just mentioned may be used. For a different purpose, the first to fourth embodiments each involve using a roller bearing or a ball bearing as an exemplary bearing supporting a target member such that the target member is rotatable while its movement in the axial direction is allowed to some degree. Alternatively, any other bearing that has functions similar to those just mentioned may be used.

INDUSTRIAL APPLICABILITY

A vehicle drive apparatus and a vehicle drive apparatus manufacturing method according to the present disclosure are usable for manufacture of a vehicle drive apparatus and particularly preferably used to meet a demand for facilitation of operations during assembly.

DESCRIPTION OF THE REFERENCE NUMERALS $1_1$, $1_2$, $1_3$, $1_4$ . . . vehicle drive apparatus (hybrid drive apparatus)/2 . . . engine/10 . . . case/11 . . . first case member (main case)/11H . . . fitting hole/12 . . . second case member (housing case)/13 . . . support member (center support)/13H . . . housing hole/13a . . . plate portion/13b . . . second support portion (support portion)/13c . . . first support portion (support portion)/25 . . . third rotation shaft (engine counter shaft) / 31 . . . first rotation shaft (second rotor shaft)/41 . . . second rotation shaft (output counter shaft)/50 . . . differential device/60A, 60B . . . positioning member (positioning pin mechanism)/61 . . . pin/62 . . . protrusion member (bolt)/AS1 . . . first assembly/AS2 . . . second assembly/AX1 . . . first axis/AX2 . . . second axis/AX3 . . . third axis/B9, B10 . . . tapered roller bearing/G1 . . . first gear/G2 . . . second gear/G3 . . . third gear/G4 . . . fourth gear/G5 . . . fifth gear/MG1 . . . first rotary electric machine (first motor)/MG2 . . . second rotary electric machine (second motor)/P1 . . . first position/P2 . . . second position/PR1 . . . motive power distribution planetary gear/CR . . . first rotary element (carrier)/R . . . third rotary element (ring gear)/S . . . second rotary element (sun gear)

The invention claimed is:

1. A vehicle drive apparatus comprising:
a case including a first case member and a second case member;
a first rotation shaft disposed on a first axis;
a first gear secured to the first rotation shaft, the first gear being a herringbone gear;
a second rotation shaft disposed on a second axis different from the first axis;
a second gear secured to the second rotation shaft and in mesh with the first gear, the second gear being a herringbone gear;
a third rotation shaft disposed on a third axis different from the first axis and the second axis;
a third gear secured to the third rotation shaft and in mesh with the second gear, the third gear being a herringbone gear;
a support member including a plate portion having a plate shape, a first support portion supporting the second rotation shaft such that the second rotation shaft is rotatable relative to the plate portion, and a second support portion supporting the third rotation shaft such that the third rotation shaft is rotatable relative to the plate portion; and
a positioning member for positioning of the support member with respect to the case, wherein
assembling the first rotation shaft to the first case member provides a first assembly,
assembling the second rotation shaft and the third rotation shaft to the support member provides a second assembly, and
with the first assembly and the second assembly assembled to each other, the first case member and the second case member are secured to each other.

2. The vehicle drive apparatus according to claim 1, comprising:
a fourth gear secured to a location on the second rotation shaft, the location being different from a location of the second gear in an axial direction, the fourth gear being a herringbone gear; and
a differential device including a fifth gear in mesh with the fourth gear, the fifth gear being a herringbone gear, the differential device being configured to output rotation of the fifth gear to a wheel, wherein
the differential device is supported by a tapered roller bearing such that the differential device is rotatable relative to the case.

3. The vehicle drive apparatus according to claim 2, wherein the positioning member includes a pin having a length that allows the pin to be housed in a housing hole defined in the support member, and a protrusion member to cause the pin to protrude from the housing hole such that the pin is fitted into both of the housing hole and a fitting hole defined in the first case member.

4. The vehicle drive apparatus according to claim 3, comprising:
a first rotary electric machine disposed on the third axis and drivingly connected to an engine;
a second rotary electric machine disposed on the first axis; and
a motive power distribution planetary gear disposed on the third axis, wherein
the motive power distribution planetary gear includes a first rotary element drivingly connected to the engine, a second rotary element drivingly connected to the first rotary electric machine, and a third rotary element drivingly connected to the third gear, and in which the motive power distribution planetary gear distributes motive power such that a driving force from the engine is distributed to the first rotary electric machine and the third gear.

5. The vehicle drive apparatus according to claim 2, comprising:
a first rotary electric machine disposed on the third axis and drivingly connected to an engine;
a second rotary electric machine disposed on the first axis; and
a motive power distribution planetary gear disposed on the third axis, wherein
the motive power distribution planetary gear includes a first rotary element drivingly connected to the engine, a second rotary element drivingly connected to the first rotary electric machine, and a third rotary element drivingly connected to the third gear, and in which the motive power distribution planetary gear distributes motive power such that a driving force from the engine is distributed to the first rotary electric machine and the third gear.

6. The vehicle drive apparatus according to claim 1, wherein the positioning member includes a pin having a length that allows the pin to be housed in a housing hole defined in the support member, and a protrusion member to cause the pin to protrude from the housing hole such that the pin is fitted into both of the housing hole and a fitting hole defined in the first case member.

7. The vehicle drive apparatus according to claim 6, comprising:
- a first rotary electric machine disposed on the third axis and drivingly connected to an engine;
- a second rotary electric machine disposed on the first axis; and
- a motive power distribution planetary gear disposed on the third axis, wherein
- the motive power distribution planetary gear includes a first rotary element drivingly connected to the engine, a second rotary element drivingly connected to the first rotary electric machine, and a third rotary element drivingly connected to the third gear, and in which the motive power distribution planetary gear distributes motive power such that a driving force from the engine is distributed to the first rotary electric machine and the third gear.

8. The vehicle drive apparatus according to claim 1, comprising:
- a first rotary electric machine disposed on the third axis and drivingly connected to an engine;
- a second rotary electric machine disposed on the first axis; and
- a motive power distribution planetary gear disposed on the third axis, wherein
- the motive power distribution planetary gear includes a first rotary element drivingly connected to the engine, a second rotary element drivingly connected to the first rotary electric machine, and a third rotary element drivingly connected to the third gear, and in which the motive power distribution planetary gear distributes motive power such that a driving force from the engine is distributed to the first rotary electric machine and the third gear.

9. A method for manufacturing a vehicle drive apparatus including:
- a case including a first case member and a second case member;
- a first rotation shaft disposed on a first axis;
- a first gear secured to the first rotation shaft, the first gear being a herringbone gear;
- a second rotation shaft disposed on a second axis different from the first axis;
- a second gear secured to the second rotation shaft and in mesh with the first gear, the second gear being a herringbone gear;
- a third rotation shaft disposed on a third axis different from the first axis and the second axis;
- a third gear secured to the third rotation shaft and in mesh with the second gear, the third gear being a herringbone gear;
- a support member including a plate portion having a plate shape, a first support portion supporting the second rotation shaft such that the second rotation shaft is rotatable relative to the plate portion, and a second support portion supporting the third rotation shaft such that the third rotation shaft is rotatable relative to the plate portion; and
- a positioning member for positioning of the support member with respect to the case, wherein the method comprises:
- a first step involving assembling the first rotation shaft to the first case member so as to provide a first assembly;
- a second step involving assembling the second rotation shaft and the third rotation shaft to the support member so as to provide a second assembly;
- a third step involving disposing the plate portion of the support member such that the plate portion is located at an axial assembling position with respect to the first assembly, rotating the second assembly around the third axis from a first position where the first gear and the second gear are located away from each other to a second position where the first gear and the second gear are in mesh with each other, and subsequently performing positioning of the second assembly at the second position by using the positioning member, thus assembling the second assembly to the first assembly; and
- a fourth step involving securing the first case member and the second case member to each other, with the first assembly and the second assembly assembled to each other.

* * * * *